Oct. 2, 1956 J. H. HOMRIGHOUS 2,765,367

TIME DIVISION MULTIPLEX MULTI-STATION PER LINE TELEPHONE SYSTEM

Filed Dec. 27, 1950 2 Sheets-Sheet 1

INVENTOR.

John H. Homrighous

Oct. 2, 1956 J. H. HOMRIGHOUS 2,765,367

TIME DIVISION MULTIPLEX MULTI-STATION PER LINE TELEPHONE SYSTEM

Filed Dec. 27, 1950 2 Sheets-Sheet 2

INVENTOR.

John H. Homrighous 2,765,367
Patented Oct. 2, 1956

2,765,367

TIME DIVISION MULTIPLEX MULTI-STATION PER LINE TELEPHONE SYSTEM

John H. Homrighous, Oak Park, Ill.

Application December 27, 1950, Serial No. 202,945

25 Claims. (Cl. 179—15)

This invention relates to a communication system and more particularly to a time division multiplex or multi-station per line telephone system.

Accordingly one of the main objects of my invention is to provide improved means for transmitting a plurality of two-way messages over a pair of conductors in different recurring periods of time without overlapping for secret communication.

Another object is to provide an improved means to select a recurring period of time or a recurring period channel for the transmission of a two-way message.

A third object is to provide improved means at each of a number of stations on a party or community telephone line to transmit and receive signaling currents and other signals representative of a message in a recurring period of time.

A further object is to provide improved telephone station equipment for multi-station or multi-party telephone lines whereby at least two parties on a common telephone line may signal and communicate with other parties on the same line at the same time without interference.

Another object is to provide in an automatic telephone system multi-party lines wherein each station on a party line may have a different set of terminal apparatus in a telephone office so that any station on a party line may be individually selected through automatic trunking switches for secret communication.

A further object of my invention is to provide a communication system of the type in which a first station or party on a line may signal a second station on the same line by dialing the directory number for the second station.

A message in this specification is to be understood to include any intelligence or any portion of any intelligence representative of voice controlled electrical signals or any control or coded electrical signals.

A channel in this specification is to be understood as a two-way path over a pair of conductors for the transmission of electrical signals between two stations or a station and a telephone office during a recurring period of time and may be one of a number of channels for the transmission of signals representative of any intelligence over a pair of conductors.

There have been developed telephone systems wherein several telephone messages may be transmitted over a pair of conductors by providing a different carrier wave for each message, or several messages may be transmitted in successive rotation over a pair of conductors by grouping the signals or reducing the interval for fragmentary portions of the signals for each message.

In the instant case a number of channels for two-way signalling and talking may be provided over a metallic telephone line, each channel for a different telephone station and utilizing a different recurring period of time for the transmission of signals, so that a party at any station on a multi-station line may secretly signal and communicate with a party at any other station on the same line, or a station on another subscriber's telephone line.

In the present multi-channel or multi-station per line system, a single recurring synchronizing signal pulse or station control signal pulse may be produced at the central telephone office and transmitted over the different party lines terminating in the office to control the station equipment on the party lines for the transmission and reception of signals during a different recurring period of time for each station, so that a number of secret two-way communications may be taking place at the same time over a single pair of conductors. These synchronizing pulses at each station may through delay networks produce different timing pulses in successive rotation to condition the various stations for the transmission and reception of message signals during a different recurring period of time at each station.

The present multi-station per line telephone system is applicable to a manual telephone system wherein a switchboard operator is required to complete a call, or a dial telephone system wherein the calling party through the manipulation of a calling device may cause automatic trunking switches to establish a connection with the called line. Furthermore, each party line may have both manual and dial stations.

So far as is known this is the first time that two or more telephone subscribers on the same party line may simultaneously dial different telephone station numbers to automatically establish connections with other subscribers' stations for two-way secret communication.

One of the main advantages of the present multi-station or party line system is in developing synchronizing or control pulses in the control office only and transmitting these pulses over the multi-station lines, thus requiring only a minimum change in the conventional telephone station equipment, with maximum use of the wire lines; that is, a pair of conductors may serve two or more stations for secret communication, whereas in the present-day telephone systems, where secrecy is required, only one station per line is employed.

Another advantage of the present telephone system is that a subscriber at a station on a multi-station or community line may call any other station on the same line without using the central office trunking switches or requiring the services of an operator at the central office.

A number may be assigned to each station, and each station may have an individual channel for signalling and message signal transmission.

This invention is an improvement over the time division multiplex telephone systems shown in Patents 2,434,697 and 2,434,698, issued January 20, 1948. In my Patent 2,532,719, issued December 5, 1950, there is shown and described time division multiplex radiophone system for wireless transmission and reception of message signals in recurring periods of time wherein a number of radio stations may be individually signaled over a single carrier wave in different recurring periods of time.

Other objects and advantages of my invention will appear from the following description, taken in connection with the accompanying drawings in which.

Figures 1, 2:
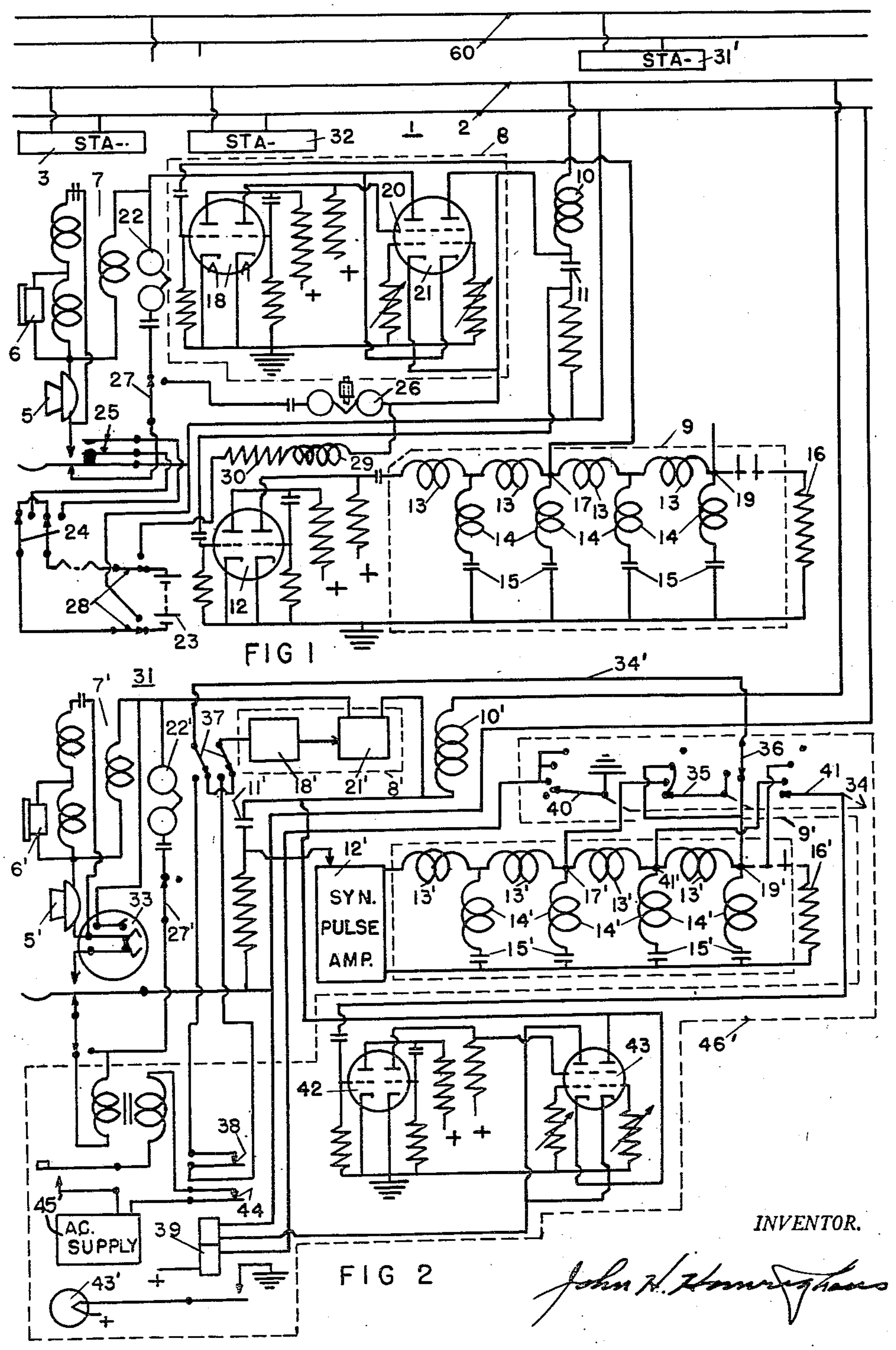
Figures 1 and 2 show telephone subscribers' station apparatus and associated circuits.
Figures 3, 4, 5, 6:
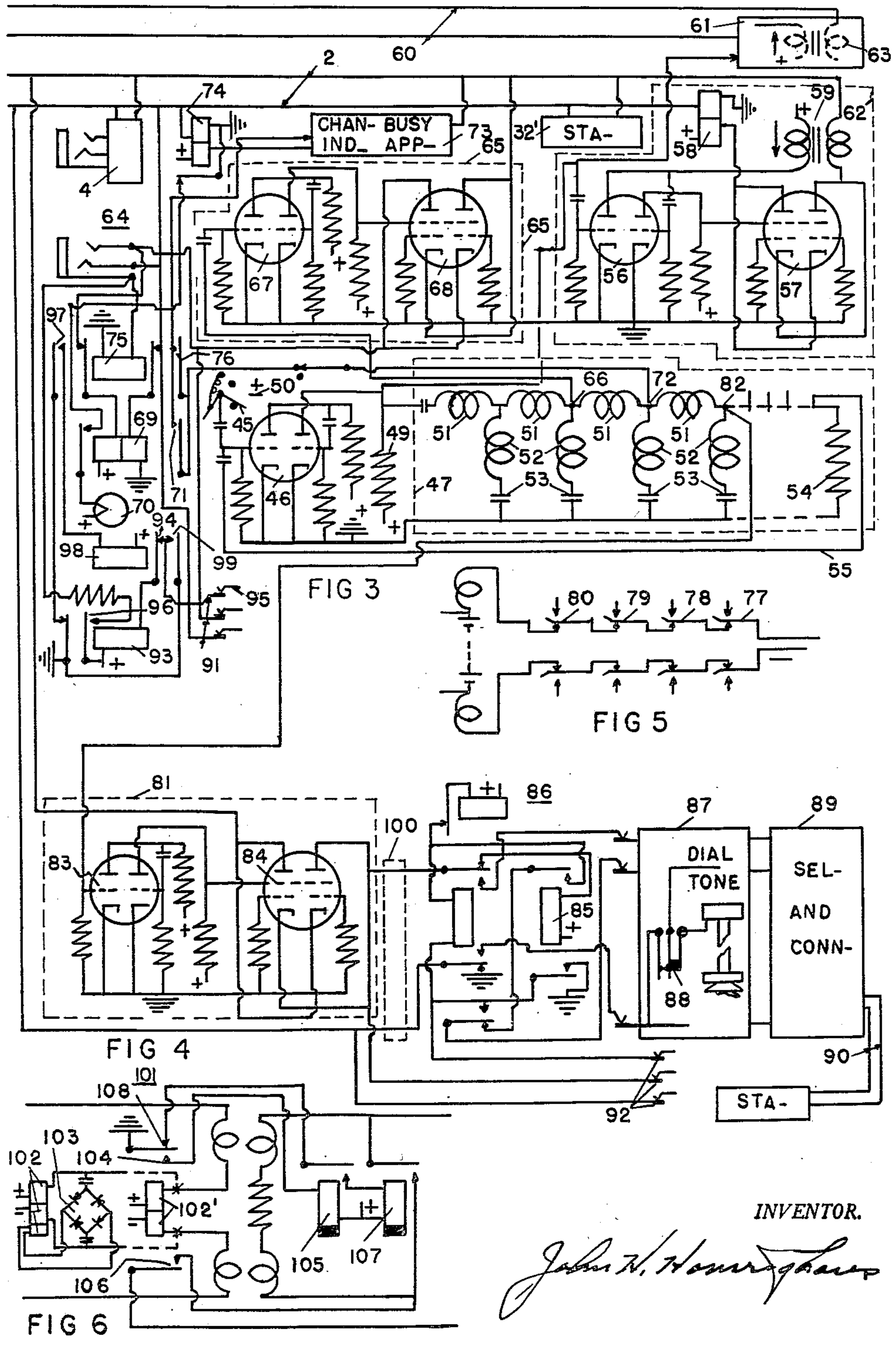
Figures 3 and 4 show the telephone central office apparatus and circuits for the subscribers' stations shown in Figures 1 and 2.
Figure 5 shows in part an operator's cord circuit for use with the apparatus shown in Figure 3.
Figure 6 shows a modification for Figure 4.

In Figure 1 the reference numeral 1 may represent a manual telephone subscriber station connected to the telephone line 2, which line may extend to the central office where the apparatus of Figure 3, associated with Figure 1, may be connected to the line. Similar station apparatus 3 and the associated office terminal apparatus 4 may be connected to the line 2.

The subscribers' station 1 may be of the manual type; that is, to make a call the subscriber removes the receiver which may bring in a signal at the manual switchboard where an operator may complete the call. This station may comprise the conventional microphone 5, receiver 6 and transformer 7. At 8 there is shown channel transmission control apparatus under control of a timing pulse produced in the timing device or pulse delay network 9.

At the telephone office a recurring synchronizing signal pulse may be produced and transmitted over line 2, to be more fully explained later. This recurring synchronizing pulse may be of a frequency above audibility and of higher amplitude than signals representative of audible messages so that the recurring pulse may be received through the low pass filter, comprising the inductance 10 and the condenser 11, and applied to the grid in the double unit synchronizing pulse amplifier tube 12. After suitable amplification in tube 12 the recurring pulse may be applied to the pulse delay network 9, comprising a series of inductances 13, shunt inductances 14 and condensers 15 terminating in a load resistor 16, to in turn produce a plurality of recurring channel timing pulses separated in time sequence. For simplicity only a few sections of the delay network are shown in detail, but it will be understood that other sections may be required in certain stations to produce the desired channel timing pulse as indicated by the dashed line.

Assuming that station 1 is assigned a first recurring period of time for signal transmission and reception, then the first channel recurring timing pulse produced at 17 in the delay network 9 would be applied to the grid in the double unit channel timing pulse amplifier tube 18. If station 1 was the number two station on the line, it would require a second recurring period for signal transmission and the second recurring timing pulse produced at 19 would be applied to the grid in tube 18. After suitable amplification in tube 18 the recurring timing pulse may be applied to the gate grid 20 in the double-unit transmission control device or tube 21 to render tube 21 conductive during a first recurring period of time. Since the anode for each unit in tube 21 is connected to the cathode for the other unit, both direct current and message signal current will flow through the tube during the first recurring period of time or the recurring period that the tube 21 is rendered conductive by the channel recurring timing pulse. Therefore signaling currents, comprising alternating currents, from the line 2 may actuate the conventional ringer 22. In response to the ringing of the bell the subscriber may remove the receiver from its resting position, which removal disconnects the ringer 22 from the line and includes the microphone in the line circuit. Whereupon two-way communication may follow with the signals being received and transmitted over the same channel or during a first recurring period, the continuity of the received signals being maintained by the time lag or inertia in the ringer 22, transformer 7 and receiver 6.

The bias for the control grids in tube 21 may be adjustable in order to compensate for any difference in ground potential at station 1 and ground potential at the central office, which ground potential is supplied to the cathode over one conductor of line 2.

The filament current for tubes 12, 18 and 21 may be supplied by a local battery 23 at the station, and also the anode potential for tubes 12 and 18 may be supplied by batteries at the station. By operation of the switch 24 the tubes 12, 18 and 21 may be energized through springs 25 only during the time that the receiver is removed from its switch hook. Therefore for secret signaling a harmonic ringer 26 would be substituted for the ringer 22 by operation of the switch 27. This ringer 26 responds to signaling current of a certain frequency only. The signaling current is supplied to the line at the central office during the first recurrent period, to be explained later. By operation of the switch 28 filament current may be supplied from the line through choke coil 29 and resistor 30.

Referring to Figure 2, the reference numeral 31 may represent a dial station connected to the line 2. At the central office the apparatus of Figure 4, associated with Figure 2, may be connected to line 2. Similar station apparatus 32 and the associated office terminal apparatus 32′ may be connected to the line 2.

The subscribers' station 31 may include a dial 33 whereby the subscriber may dial the number of the desired station. This station is quite similar to station 1, and like parts have been given like reference numerals, primed.

The recurring synchronizing or control signal pulse may be received from the line 2 through the inductances 10′ and condenser 11′ and applied to the synchronizing pulse amplifier 12′. After suitable amplification in tube 12′ the recurring pulse may be applied to the pulse delay network 9′ to produce a plurality of channel recurring timing pulses.

Assuming that station 31 is assigned a second recurring period of time for signal transmission and reception, then the second recurring channel timing pulse produced at 19′ in the delay network 9′ would be applied over conductor 34′ to the double-unit channel timing pulse amplifier 18′. After suitable amplification in tube 18′ the recurring timing pulse may be applied to the gate grid in the double-unit transmission control tube 21′ to render the latter tube conductive during a second recurring period of time. Therefore signaling current applied to the line 2 at the control office during the second recurring period may actuate the ringer 22′. The subscriber may answer the call by removing the receiver from its hook switch, whereupon two-way conversation may follow, as outlined above for station 1.

The filament current an anode potential for the tubes in Figure 2 may be as shown in Figure 1, and a harmonic ringer 26′ may be employed in place of the conventional ringer 22′.

By manipulation of the dial 33 the line may be intermittently opened by the dial springs to cause longer periods of current interruptions in the line than the channel recurring timing pulse period to actuate a line or pulsing relay in the trunking switches at the central office.

In order that the subscriber at station 31 may call any other station on the same party or community line, such as station 1, without utilizing at the central office an operator or the automatic trunking switches, there is provided a recurring timing pulse multi-position selector switch 34, whereby the assigned recurring transmission period for any station on the same party or community line may be selected by the selection of the proper recurring timing pulse. Switch 34 in its normal or standby position as indicated on the drawings, may apply the second recurring timing pulse from 19′ over the following path: brush 35, switch 36, conductor 34′, switch 37, relay spring contacts 38 to the tube 18′.

Assuming that station 31 is calling station 1, then switch 34 would be rotated to its second position before removing the receiver from its switch hook. Slow-to-release relay 39 would be momentarily energized from battery through the lower winding of relay 39 to ground at brush 40, brush 40 being positioned to make contact as brush 35 is rotated from one contact to another of its contacts. Should station 1 be busy, then direct current would be applied to the line at the central office during a station busy indicating recurring period occurring between the first channel recurring period and the second channel recurring period, to be explained later. At station 31 a recurring timing pulse produced at 41′ in the delay network 9′, between the first and second channel recurring timing pulses produced at 17′ and 19′, may be applied through brush 41 to the control grid in the double unit timing pulse amplifier 42. After suitable amplification in tube 42 the recurring timing pulse may be applied to the gate grid in the double unit transmission control tube 43 to render the latter tube, similar to tube 21, conductive during the first station busy indicating recurring period. Therefore direct current applied to the line 2 during the busy indicating recurring period for the first station will flow through the upper winding of relay 39 to maintain it energized. Lamp 43′ indicates that the called station is busy. The energization of relay 39 opens springs 38 to prevent the reception and transmission of signals during the selected channel recurring period. Also, springs 44 are opened to prevent ringing current transmission during the selected channel recurring period.

If the called station 1 was idle, then relay 39 would be deenergized and tube 21′ would be rendered conductive during the selected channel recurring period, as explained above, so that ringing current from 45′ may be supplied to the line 2 to signal the called station, and thereafter message signals may be transmitted during the selected recurring period for two-way communication.

The switch 34 may be rotated to other positions to select the signal transmission periods for other stations.

While I have shown the apparatus 46′ associated with station 31, it is to be understood that similar apparatus may be utilized at the manual station 1 so that a subscriber at station 1 may call any other subscriber on the same line without the necessity of calling an operator.

At the telephone office there may be provided a pulse generator, Figure 3, comprising a pulse starting switch 45, synchronizing pulse amplifier 46 and a pulse delay network 47, similar to the network 9, to produce a recurring synchronizing pulse and a plurality of channel recurring timing pulses. This pulse generator and the pulse delay networks in Figures 1 and 2 are similar to the pulse generator and pulse delay networks described in my copending application Serial No. 69,772, filed January 7, 1949.

The toggle switch 45 may be operated to cause a positive pulse of relatively short duration to be applied to the left control grid in tube 46 from positive potential at 50 to produce a positive pulse at load resistor 49. The synchronizing pulse produced at 49 may be applied to the pulse delay network 47 comprising a series of inductances 51, shunt inductances 52 and condensers 53 terminating in a load resistor 54, to in turn produce a plurality of channel timing pulses. The pulse produced at the last section of the delay network may be applied over conductor 55 to the control grid in the left unit of tube 46 to produce a recurring synchronizing pulse and in turn a plurality of channel recurring timing pulses in synchronism with the channel recurring timing pulses produced in the several subscribers' stations.

The recurring synchronizing pulse produced at load resistor 49 may be applied to the double unit synchronizing pulse amplifier 56. After amplification in tube 56 the recurring synchronizing pulse may be applied to the gate grid in the transmission control tube 57, whereby direct current may be supplied to line 2 from battery through the windings of coil 58 during the recurring period that the recurring synchronizing pulse is produced. To transmit the recurring synchronizing pulse over line 2 battery is supplied through the primary winding of the transformer 59 to the anode of the left unit in the synchronizing pulse amplifier 56, thereby producing a positive recurring synchronizing pulse in the transformer secondary winding, which is connected in series with one conductor of the line, during the time that direct current is fed to the line through the coil 58.

Line 60 may be one of a number of other pairs of conductors paralleling or in the same cable as line 2, with the apparatus 61 connected thereto, which apparatus may be similar to the apparatus 62 for line 2 except that the connections to the primary winding for line transformer 63 would be reversed to that shown for the primary winding of transformer 59, so that a negative recurring synchronizing pulse may be supplied to line 60 to reduce interference caused by positive pulse transmission over line 2.

The terminal equipment at the central office associated with station 1 may comprise a jack, relays and supervisory signal 64 and channel transmission control apparatus 65 under control of a channel timing pulse produced in the pulse delay network 47 for controlling message signal transmission and reception. Since station 1 utilizes a first recurring period for signal transmission the first channel recurring timing pulse produced at 66 in the network 47 may be applied to the amplifier 67. After amplification in 67 the recurring pulse may be applied to the gate grid in the transmission control tube 68 to render the latter tube conductive to supply direct current from battery through the windings of line relay 69 to the line during a first recurring period of time.

Assuming that a call is being made from station 1, then the line circuit at station 1 would be closed during a first recurring period, as previously explained, to cause energization of line relay 69. Energization of relay 69 completes a circuit from ground at the brake contacts springs of relay 74 for the supervisory lamp 70, thereby notifying the operator of a waiting call, and at springs 71 a channel busy indicating recurring pulse from 72 in the network 47 may be applied to the channel busy indicating apparatus 73, which apparatus is similar to the apparatus 65, to supply direct current to the line through the coil 74 during the busy indicating recurring period for station 1, so that the relay 39 in station 31 and relay 74 will be held energized when station 31 through the multi-position switch 34 attempts to call a busy station, such as station 1. If station 1 were idle, relay 74 may be energized upon removal of the receiver, but relay 39 will remain in its nonoperative position because current in the upper winding only will not actuate its armature. The energization of relay 74 at this time disconnects ground from the supervisory lamp. Therefore the operator would not receive a signal when one station by operation of his multi-position switch 34 calls another station on the same line. The operator may answer the call from station 1 through an answering plug, not shown, in a conventional cord circuit. The cut off relay 75 is energized over the sleeve conductor in the cord circuit, in a well-known manner, to transfer the direct current supplied to the line through relay 69 by direct current supplied through the connecting cord circuit; also the recurring pulse circuit opened at springs 71, relay 69, is closed at springs 76 to continue supplying current to the line 2 through coil 74. The other plug of the cord circuit, not shown, may be connected to a trunk line or another subscriber line for two-way communication.

The operator in calling the subscriber at station 1 inserts a plug of her conventional cord circuit into the jack shown in Figure 3, and by operation of a ringing key, such as key 77, Figure 5, signaling current may be supplied to the line 2 during the first recurring period, which may be followed by message signal transmission. When the electron tubes in station 1 remain deenergized until the receiver is removed from the hook switch and the station is provided with a harmonic ringer, as described above, the cord circuit of Figure 5 may be used, wherein the keys 78, 79 and 80 may each supply signalling current of a different frequency to line 2 during the first recurring period, with only one bell responding to a particular frequency. The operation of key 78 may cause the bell 26 at station 1 to ring.

The terminal equipment at the telephone office associated with station 31 may comprise the channel transmission control apparatus 81, under control of a channel timing pulse produced in the pulse delay network 47 for controlling message signal transmission and reception. Since station 31 utilizes a second recurring period for signal transmission, the second channel recurring timing pulse produced at 82 in the network 47 may be applied to the timing pulse amplifier 83. After amplification in tube 83 the recurring timing pulse may be applied to the gate grid in the transmission control tube 84 to render the latter tube conductive to supply direct current from battery through the winding of relay 85 in the automatic trunking switch 86 associated with the terminal apparatus 81.

Assuming that a call is being made from station 31, then the line circuit at station 1 would be closed during a second recurring period, as previously explained. The switch 86 may be automatically operated to seize a first selector switch 87, whereupon dial tone would be supplied to the calling line through the off normal springs 88, which springs are opened upon the first vertical step of switch 87. By manipulation of the dial at station 31 in accordance with the digits in the number of a called station, the automatic trunking switches indicated at 87 and 89 may be operated to interconnect the line 2 with another subscriber's line, such as line 90, or to make connection with the switch terminals 91, Figure 3, on the same line. Switch terminals 92 are for selection by connector switches controlled from other stations.

Detailed description of the step-by-step switches is thought to be unnecessary in this application since they are well known in the communication art and may be similar to those shown and described in chapters 1 through 4 of Automatic Telephony, by Smith and Campbell, 1914 edition, and chapters 1 through 3 of Telephone Theory and Practice, by Miller, 1933 edition; or they may be similar to those shown in Patent 1,586,308, to Homrighous, issued May 25, 1926. While I have shown step-by-step machine switching equipment, it is to be understood that the novel features of this invention may be equally applicable to other machine switching systems, such as "panel" and "crossbar" systems.

When the terminals 91 are seized by a connector switch, relay 93 may be energized from battery through the winding of relay 93, brake contact springs 94, connector switch brush 95 to ground potential in the connector switch, not shown. Relay 93, upon energizing, closes a circuit at springs 96 for the relay 75, which will now be energized to disconnect the line relay 69 from the line. When a cord circuit plug is inserted into the jack, relay 75 would be energized, as explained above, to close a circuit at springs 97 for relay 98. Relay 98, upon energizing, applies ground potential through springs 99 to the top terminal 91 to provide a station busy test for the automatic trunking switch, thereby preventing connection through the trunking switch when the station is in use.

Figure 6 shows a signal repeater that may be inserted in the line at 100, Figure 4, to take care of long lines with relatively high resistance, so that the relay 101 may be adjusted to the particular condition of its associated line. This relay and the relay 69, Figure 3, may have laminated cores to make the relays more sensitive to the intermittent line currents. In some instances these line currents may be interrupted at relatively high frequency and may be considered as pulsating currents. With pulsating currents, relay coils 102 may replace the relay coils 102'. The coils 102 may comprise three windings, with the third winding energized by the pulsating currents rectified at 103. Relay 101 may be energized by removing the receiver from its resting position at station 31. Upon energization, relay 101 closes a circuit through spring 104 for slow-to-release relay 105, and at springs 106 the line circuit to the trunking switch 86 is closed. In response to dial pulses, slow-to-release relay 107 is energized through spring 108 to bridge the repeating coil 109 during dial pulses.

In certain of the circuits shown and described, I have simplified the drawing by indicating the source of potential by a sign. Also, in certain figures I have omitted the heater filaments for the various tubes, but it will be understood that such filaments are necessary.

The embodiments of the invention which have been given herein are illustrations of the ways the various features may be accomplished and of the principles involved. It is to be understood that the invention disclosed herein is capable of embodiment in various forms and adaptations, without departing from the spirit of the invention.

Having thus described my invention, I claim:

1. In a telephone system, a subscriber's telephone station having a line connected to a source of direct current at a telephone office, means at said station to receive from said line a recurring synchronizing pulse, means at said station including a pulse delay network responsive to said received recurring pulse to produce a plurality of recurring timing pulses, means associated with said pulse delay network including a multi-position switch rotatable to different positions to select a different one of said recurring timing pulses in each position of the switch, and means including a gate electron tube under control of any selected one of said recurring timing pulses for varying the direct current in said line during a recurring period of time to transmit signals representative of a message.

2. In a telephone system, a first telephone station and a second telephone station having a common line connected to a source of direct current at a telephone office, means at each of the said stations to receive from said line a recurring synchronizing pulse, means including a pulse delay network at each of the said stations responsive to said received recurring pulse to produce a plurality of recurring timing pulses, each of the said recurring timing pulses produced at each of the said stations for controlling at the respective stations signal transmission and signal reception during a different recurring period of time for each of the said recurring timing pulses, with a first one of said recurring periods assigned to said first station and a second one of said recurring periods assigned to said second station, for signal current reception and signal current transmission, means including a multi-position switch associated with the said pulse delay network at said first station to select a certain one of said recurring timing pulses produced thereat to in turn select the said second recurring period and means including a gate electron tube under control of the selected said certain one recurring timing pulse for transmitting signaling current over said line during the selected said second recurring period to signal said second station.

3. A telephone system as claimed in claim 2, and in addition there is provided electrically operable means at said first station to prevent signaling current transmission if said second station is busy.

4. In a telephone system, a telephone office, a subscriber's telephone station having a line connected to a source of direct current at said telephone office, pulse generator means at said office including an electron tube and an associated pulse delay network coupled in series relation to produce a recurring synchronizing pulse and a plurality of first recurring channel timing pulses, means including a gate amplifier under control of said recurring synchronizing pulse to transmit said recurring synchronizing pulse over said line, means at said station including another electron tube and associated pulse delay network under control of said recurring synchronizing pulse to produce a plurality of second recurring channel timing pulses, a first gate electron tube at said office adapted to periodically cause current to flow in said line, a second gate electron tube at said station adapted to periodically cause current to flow in said line, and means including said first electron tube and said second electron tube under control of a first one of said first recurring channel timing pulses and a first one of said second recurring channel timing pulses respectively to vary the current in said line during a recurring period of time to transmit signals representative of a two-way communication over said line.

5. In a telephone system, a telephone office, a subscriber's telephone station having a line terminating in a telephone office, pulse generator means at said telephone office including an electron tube and an associated pulse delay network coupled in series relation to produce a recurring synchronizing pulse and a plurality of first recurring channel timing pulses, a gate electron tube at said office adapted to cause current to flow in said line during the occurrence of said synchronizing pulse, means including said gate electron tube under control of said recurring synchronizing pulse to transmit said recurring synchronizing pulse over said line, means at said station including another electron tube and associated pulse delay network under control of said recurring synchronizing pulse to produce a plurality of second recurring channel timing pulses and means including a first one of said first recurring timing pulses at said office and a first one of said second recurring timing pulses occurring at substantially the same time at said station to transmit signals representative of a two-way communication over said line between the said office and said station during a recurring period of time.

6. In a telephone system, a telephone office, a first telephone station having a line extending to said telephone office, pulse generator means at said office including an electron tube and an associated first pulse delay network coupled in series relation to produce a recurring synchronizing pulse and a plurality of recurring channel timing pulses, means including a gate electron tube under control of said recurring synchronizing pulse to transmit said recurring synchronizing pulse over said line, means at said station to receive said recurring synchronizing pulse, means at said station including a second pulse delay network responsive to said received recurring synchronizing pulse to produce at least one recurring channel timing pulse, said one recurring timing pulse and a second recurring timing pulse occurring at the same time at said office controlling signal transmission from said station over said line during a first recurring period of time, a second telephone station having another line extending to said telephone office and means including a cord circuit at said office to interconnect said lines for two-way message signal transmission between said stations.

7. In a telephone system, a telephone office, a first telephone station having a first line connected to a source of direct current at said telephone office, a calling device for said station, pulse generator means at said office including an electron tube and an associated first pulse delay network coupled in series relation to produce a recurring synchronizing pulse and a plurality of recurring channel timing pulses, means including a gate electronic device under control of said recurring synchronizing pulse to transmit said recurring synchronizing pulse over said line, means at said station to receive said recurring synchronizing pulse, means at said station including a second pulse delay network responsive to said received recurring synchronizing pulse to produce at least one recurring channel timing pulse, said one recurring timing pulse and a second recurring timing pulse occurring at the same time at said office controlling signal transmission from said station over said line during a first recurring period of time, a second numerically designated telephone station having another line extending to said telephone office and means including a plurality of automatic trunking switches at said office actuated, according as said calling device is manipulated for the various characters in the number for said second station to interrupt the direct current in said first line during said first recurring period, to interconnect said lines for two-way message signal transmission between said stations.

8. In a telephone system, a telephone office, a first telephone station and a second telephone station having a common line extending to said telephone office, pulse generator means at said office including an electron tube and an associated pulse delay network coupled in series relation to produce a recurring control pulse and a plurality of recurring channel timing pulses, means including a transmission control tube under control of said recurring control pulse to transmit said recurring control pulse over said line, means at each of the said stations to receive said recurring control pulse, means at each of the said stations including a pulse delay network responsive to said received recurring control pulse to produce a plurality of recurring timing pulses each of the said recurring timing pulses produced at each of the said stations and said office for controlling at the respective stations and office signal transmission during different recurring periods of time with a first one of said recurring periods assigned to said first station and a second one of said recurring periods assigned to said second station, a first jack and associated first apparatus for said first station connected to said line in said office, said apparatus responsive to a first recurring timing pulse produced in the office to control signal transmission during said first recurring period, a second jack and associated second apparatus for said second station connected to said line in said office, said second apparatus responsive to a second recurring timing pulse produced in the office to control signal transmission during said second recurring period and means including a cord circuit to interconnect said first and second jacks for two-way message signal transmission between said stations during said first and second recurring periods.

9. In a telephone system, a telephone office, a first telephone station and a second telephone station numerically designated having a common line connected to a source of direct current at said telephone office, a calling device for said first station, pulse generator means at said office including an electron tube and an associated pulse delay network coupled in series relation to produce a recurring synchronizing pulse and a plurality of recurring channel timing pulses, means including a transmission control tube under control of said recurring synchronizing pulse to transmit said recurring synchronizing pulse over said line, means at each of the said stations to receive said recurring synchronizing pulse, means at each of the said stations including a pulse delay network responsive to said received recurring synchronizing pulse to produce a plurality of recurring channel timing pulses, each of the said recurring timing pulses produced at each of the said stations and said office for controlling at the respective stations and office signal transmission during different recurring periods of time with a first one of said recurring periods assigned to said first station and a second one of said recurring periods assigned to said second station, first terminal apparatus for said first station connected to said line in said office, said apparatus responsive to a first recurring timing pulse produced in the office to control signal transmission during said first recurring period, second terminal apparatus for said second station connected to said line in said office, said second apparatus responsive to a second recurring timing pulse produced in the office to control signal transmission during said second recurring period and means including a plurality of automatic trunking switches at said office actuated according as said calling device is manipulated for the various characters in the number for said second station to interrupt the direct current in said line during said first recurring period, to interconnect said terminal apparatuses for two-way message signal transmission between said stations during said first and second recurring periods.

10. A telephone system as claimed in claim 9 and in addition there is provided means including a member associated with one of said switches to apply dial tone to said line during said first recurring period to inform the subscriber at said first station to start using the calling device.

11. In a telephone system, a telephone office, a plurality of telephone stations having a common line extending to said telephone office, pulse generator means at said office including an electron tube and an associated pulse delay network coupled in series relation to produce a recurring synchronizing pulse and a plurality of recurring channel timing pulses, a gate electron tube for said line, said gate tube comprising a first unit anode and cathode and a second unit anode and cathode with the anodes in the first and second units connected to the cathodes in the second and first units respectively, means including said gate tube under control of said recurring synchronizing pulse to transmit said recurring synchronizing pulse over said line, means at each of the said stations to receive said recurring synchronizing pulse, means at each of the said stations including a pulse delay network responsive to said received recurring synchronizing pulse to produce a plurality of recurring channel timing pulses, each of the said recurring timing pulses produced at each of the said stations and said office for controlling at the respective stations and office signal transmission and signal reception during different recurring periods of time with a different one of said recurring periods assigned to each station for call signal reception.

12. In a telephone system, a telephone office, a plurality of telephone stations having a common line extending to said telephone office, pulse generator means at said office including a pulse delay network to produce a recurring synchronizing pulse and a plurality of recurring channel timing pulses, a gate electron tube for said line, said gate tube comprising a first unit anode and cathode and a second unit anode and cathode with the anodes in the first and second units connected to the cathodes in the second and first units respectively, means at said office including said gate tube under control of said recurring synchronizing pulse to transmit said recurring synchronizing pulse over said line, means at each of the said stations to receive said recurring synchronizing pulse, means at each of the said stations including a pulse delay network responsive to the said received recurring synchronizing pulse to produce at least one recurring channel timing pulse occurring during a different period of time at each station, each of the said recurring timing pulses produced at each of the said stations and said office for controlling at the respective stations and office signal transmission and signal reception during a different recurring period of time for each station.

13. A telephone system as claimed in claim 12, and in addition there is provided separate terminal apparatus for each of the said stations connected to said line at the said telephone office, said terminal apparatuses under control of the said recurring timing pulses produced in said office to control the transmission of signals during a different recurring period of time for each station.

14. A telephone system at claimed in claim 12, and in addition there is provided apparatus and suitable circuits at each of the said stations under control of the recurring timing pulse produced at the associated station to control at each station the transmission of signals during a different recurring period of time.

15. In a telephone system, a telephone office, a plurality of telephone stations having a first line extending to said telephone office, pulse generator means at said office including a pulse delay network to produce a recurring synchronizing pulse and a plurality of recurring channel timing pulses, means at said office including a first gate transmission control tube under control of said recurring synchronizing pulse to transmit said recurring synchronizing pulse over said line, means including a second gate transmission control tube under control of a first one of said recurring timing pulses to transmit signaling currents over said line during a first recurring period of time, means at a first one of said stations to receive said signaling currents to inform the subscriber of a waiting call, a telephone receiver for said first station, means at said first station in response to the removal of the said receiver from its normal inoperative position to condition said first station for the reception of said recurring synchronizing pulse, means at said first station including another pulse delay network responsive to the said recurring synchronizing pulse received at the first station to produce at least one recurring timing pulse in synchronism with said first recurring timing pulse, and means at said first station including a gate electron tube under control of said one recurring timing pulse to control message signal transmission and reception during said first recurring period.

16. A telephone system as claimed in claim 15, and in addition there is provided other party telephone lines paralleling said first line, and means in said office including another gate transmission control tube to transmit said recurring synchronizing pulse in opposite phase over a second one of said other party lines to reduce the inductive effect in certain of the said lines caused by the transmission of said recurring synchronizing pulse over said first line.

17. In a telephone system, a telephone office, a plurality of telephone stations having a first line extending to said telephone office, a relay for each station connected to the line and a source of direct current at said office, a supervisory lamp associated with each relay, pulse generator means at said office including a pulse delay network to produce a recurring synchronizing pulse and a plurality of recurring channel timing pulses, means at said office including a gate transmission control tube under control of said recurring synchronizing pulse to transmit said recurring synchronizing pulse over said line, a telephone receiver for a first one of said stations, means at said first station, in response to the removal of said telephone receiver from its normal position to condition said first station for the reception of said recurring synchronizing pulse, means at said first station including another pulse delay network responsive to the said recurring synchronizing pulse received at the first station to produce at least one recurring timing pulse in synchronism with a first one of said recurring channel timing pulses to cause current flow through a first one of said relays during a first recurring period of time to actuate the same, thereby causing the associated lamp to glow to inform an operator of a waiting call.

18. A telephone system as claimed in claim 17, and in addition there is provided means including office station terminal apparatus connected to said line under control of a second one of said channel timing pulses to transmit signaling current over said line during a second recurring period of time to signal a second one of said stations.

19. A telephone system as claimed in claim 7, and in addition there is a third telephone station connected to said first line, means at said third station to receive said recurring synchronizing pulse, means at said third station including a third pulse delay network responsive to said received recurring synchronizing pulse to produce another recurring channel timing pulse, said another recurring timing pulse and a fourth recurring timing pulse occurring at the same time at said office controlling signal transmission from said third station over said first line during a second recurring period of time.

20. In a telephone system, a telephone office, a telephone station having a first telephone line extending to said telephone office, pulse generator means at said office including an amplifier and an associated pulse delay network coupled in series relation to produce a recurring control pulse and a plurality of office channel recurring timing pulses, means including a gate transmission control tube under control of said recurring control pulse to transmit said recurring control pulse over said line, means at said station including another pulse delay network responsive to said received recurring control pulse to produce a plurality of station channel recurring timing pulses in synchronism with said office recurring timing pulses, each of the said recurring timing pulses produced at said station and said office for controlling at said station and said office signal transmission during different recurring periods of time with a first one of said recurring periods assigned to said first station, first terminal apparatus for said station connected to said line in said office, said apparatus responsive to a first office channel recurring timing pulse to control signal transmission and recption during said first recurring period, a second telephone line terminating in said office, second terminal apparatus connected to said second line in the said office, said second terminal apparatus responsive to said first office channel recurring timing pulse to control signal transmission and reception, and means including an office link circuit to interconnect said telephone lines for two-way message signal transmission thereover during said first recurring period.

21. In a telephone system, a telephone office, a telephone station having a first telephone line extending to said telephone office, pulse generator means at said office including an amplifier and an associated pulse delay network coupled in series relation to produce a recurring control pulse and a plurality of office channel recurring timing pulses, means including a gate transmission control tube under control of said recurring control pulse to transmit said recurring control pulse over said line, means at said station including another pulse delay network responsive to said received recurring control pulse to produce a plurality of station channel recurring timing pulses in synchronism with said office recurring timing pulses, each of the said recurring timing pulses produced at said station and said office for controlling at said station and said office signal transmission during different recurring periods of time with a first one of said recurring periods assigned to said first station,terminal apparatus for said station connected to said line in said office, said apparatus responsive to a first office channel recurring timing pulse to control signal transmission and rectpion during said first recurring period, a second telephone line terminating in said office, and means including a cord circuit having at least one removable plug to interconnect said telephone lines for two-way message signal transmission thereover during said first recurring period.

22. In a telephone system, a telephone office, a telephone station having a first telephone line extending to said telephone office, pulse generator means at said office including an amplifier and an associated pulse delay network coupled in series relation to produce a recurring control pulse and a plurality of office channel recurring timing pulses, means including a gate transmission control tube under control of said recurring control pulse to transmit said recurring control pulse over said line, means at said station including another pulse delay network responsive to said received recurring control pulse to produce a plurality of station channel recurring timing pulses in synchronism with said office recurring timing pulses, each of the recurring timing pulses produced at said station and said office for controlling at said station and said office signal transmission during different recurring periods assigned to said first station, terminal apparatus for said station connected to said line in said office, said apparatus responsive to a first office channel recurring timing pulse to control signal transmission and reception during said first recurring period, a second telephone line terminating in said office, and means including a plurality of automatic trunking switches at said office actuated according as a calling device at said station is manipulated to intermittently open the said first telephone line to interconnect both of said telephone lines for two-way message signal transmission thereover during said first recurring period.

23. In a telephone system, a first telephone station and a second telephone station having a common line connected to a source of direct current at a telephone office, means at each of the said stations to receive from said line a recurring synchronizing pulse, means including a pulse delay network at each of the said stations responsive to said received recurring synchronizing pulse to produce a plurality of pairs of recurring timing pulses, the first recurring timing pulse in each pair of recurring timing pulses produced at each of said stations for controlling at the respective stations signal transmission and signal reception during a different recurring period of time for each pair of recurring timing pulses, a first pair of said recurring timing pulses assigned to said first station and a second pair of said recurring timing pulses assigned to said second station, means including a multi-position switch associated with the said pulse delay network at said first station to select said second pair of said recurring timing pulses to in turn select a certain one of said recurring periods for two-way message signal transmission over said line, and means at said first station under control of the said second recurring timing pulse in said selected pair of recurring timing pulses to prevent signal transmission and reception during said certain one recurring period if said second station is busy.

24. In a telephone system, a subscriber's telephone station having a line connected to a source of direct current at a telephone office, means at said station to receive from said line a recurring synchronizing pulse during a first recurring period of time, means at said station including an amplifier and associated pulse delay network responsive to said received recurring synchronizing pulse to produce a recurring timing pulse during a second recurring period of time, and means including a transmission control electron device under control of said recurring timing pulse to cause current from said source to flow in said line during said second recurring period of time to transmit and receive signals, representative of a two-way message.

25. A telephone system as claimed in claim 22, and in addition there is provided a signal repeater for said first line to receive and retransmit line signals.

References Cited in the file of this patent

UNITED STATES PATENTS

| | | |
|---|---|---|
| 2,363,062 | Hartley | Nov. 21, 1944 |
| 2,490,833 | Ransom | Dec. 13, 1949 |
| 2,520,185 | Mierlo | Aug. 29, 1950 |
| 2,553,605 | Ransom | May 22, 1951 |
| 2,610,254 | Deloraine et al. | Sept. 9, 1952 |